(12) United States Patent
McTeggart et al.

(10) Patent No.: US 12,118,048 B1
(45) Date of Patent: Oct. 15, 2024

(54) INTERFACE AGNOSTIC VALIDATED UNIFIED PLATFORM QUERIES

(71) Applicant: Rapid7, Inc., Boston, MA (US)

(72) Inventors: Ralph McTeggart, Belfast (GB); Ryan Williams, Lisburn (GB); Martin Hutchings, Lisburn (GB); Daniel Skelton, Belfast (GB); Sarah Addis, Belfast (GB)

(73) Assignee: Rapid7, Inc., Boston, MA (US)

( * ) Notice: Subject to any disclaimer, the term of this patent is extended or adjusted under 35 U.S.C. 154(b) by 305 days.

(21) Appl. No.: 16/939,482

(22) Filed: Jul. 27, 2020

(51) Int. Cl.
| | |
|---|---|
| *G06F 16/9535* | (2019.01) |
| *G06F 16/242* | (2019.01) |
| *G06F 16/9538* | (2019.01) |
| *H04L 9/32* | (2006.01) |
| *H04L 67/02* | (2022.01) |

(52) U.S. Cl.
CPC ...... *G06F 16/9535* (2019.01); *G06F 16/2433* (2019.01); *G06F 16/9538* (2019.01); *H04L 9/3213* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2008/0183902 A1* | 7/2008 | Cooper | H04L 67/02 709/250 |
| 2015/0058314 A1* | 2/2015 | Leclerc | G06F 16/9535 707/711 |
| 2015/0074191 A1* | 3/2015 | Feng | H04L 67/55 709/204 |
| 2017/0103102 A1* | 4/2017 | Alison | G06F 16/245 |
| 2019/0238592 A1* | 8/2019 | Qureshi | G06F 21/53 |

FOREIGN PATENT DOCUMENTS

| | | | | |
|---|---|---|---|---|
| CA | 2782674 A1 * | 6/2010 | | G06F 15/167 |
| EP | 3336785 A1 * | 6/2018 | | G06F 3/1454 |

\* cited by examiner

*Primary Examiner* — Amresh Singh
(74) *Attorney, Agent, or Firm* — Ashwin Anand

(57) ABSTRACT

Disclosed herein are methods, systems, and processes for accepting and servicing interface agnostic validated unified platform queries. A request for shared data associated with web applications received from a user interface that is rendered by a client based on a specification is intercepted. The request is forwarded to a unified application programming interface (API) instead of a disparate unique API associated with the web applications. The request from the client is authenticated externally using the unified API and the request for the shared data is authorized to be displayed in the user interface based on the unified API instead of the specification.

17 Claims, 5 Drawing Sheets

INTERFACE AGNOSTIC VALIDATED UNIFIED PLATFORM QUERIES

BACKGROUND

Field of the Disclosure

This disclosure is related is to data collection and analysis (DCA) mechanisms in cybersecurity computing environments. In particular, this disclosure is related to generating validated and authenticated platform-based queries using a single unified application programming interface (API) that is interface agnostic.

Description of the Related Art

In modern cybersecurity computing environments, cybersecurity software and services are often provisioned and implemented from a centralized cloud-based computing platform (e.g., a cloud cybersecurity platform (hereinafter "platform") such as The Insight Cloud Platform provided by Rapid7® of Boston, MA). Such a platform typically provides disparate cybersecurity services, functions, and operations to multiple client computing devices (e.g., associated with multiple disparate customers) and is made possible by various cybersecurity software applications (hereinafter "applications") that operate in tandem on the platform.

The applications that execute on the platform can operate separately, in tandem, or in a complementary manner. In cybersecurity computing scenarios, such applications often collect and depend on vast amounts of data that is gathered from clients (e.g., vulnerability data, event information, and the like). Therefore, the applications generate 'shared data' that can be queried by more than one client (e.g., curated requests that include queries for specific data that are made to the platform by one or more clients). Unfortunately, providing this shared data to multiple clients in a harmonized manner such that the shared data is correctly rendered and displayed on various dissimilar user interfaces is a technical problem that is further exacerbated by disparate security requirements of the various clients.

SUMMARY OF THE DISCLOSURE

Disclosed herein are methods and systems for processing interface agnostic unified platform queries that are validated and authenticated. One such method involves intercepting a request for shared data associated with web applications that is received from a user interface associated with a client, where the user interface is rendered by the client based on a specification. The method involves forwarding the request to a unified application programming interface (API) instead of a disparate unique API associated with each of the web applications, authenticating the request from the client externally using the unified API, and authorizing the request for the shared data to be displayed in the user interface based the unified API instead of the specification.

In certain embodiments, the method involves intercepting another request for the shared data from another user interface associated with another client that is rendered based on another specification, forwarding the another request to the unified API instead of the disparate unique API associated with each of the web applications, authenticating another request from the another client using the unified API, and authorizing another request for the shared data to be displayed in another user interface based the unified API instead of another specification.

In one embodiment, the specification and another specification cause the shared data to be rendered differently in the user interface and another user interface and the request and another request each include a script with a token configured for the unified API. In another embodiment, the method involves generating a shared user interface component to enable the unified API to display the shared data in the user interface and another user interface.

In some embodiments, the request includes an organization header, an identity management session, a consumer header, a content type, and a body. The body includes a query, and the query includes an organization identifier and a host group identifier. The query is permitted as part of authenticating the request if the query meets role base access control (RBAC) requirements. In other embodiments, the shared data is displayed in the user interface based on a data structure defined by the unified API instead of the specification, the query is generated using a single query language, the single query language is provided by a single query language service, and the authentication is performed on one or more web sockets using a standardized subscription request type of a subscription for the single query language service.

In certain embodiments, the method involves, as part of authorizing the request, appending a header to the request that includes validation information associated with authenticating the request and appending another header to the request that indicates that the request has been validated using the unified API instead of the disparate unique API.

In some embodiments, the shared data is collected by an agent executing on the client for the web applications, and the web applications include a vulnerability risk management (VRM) application, an incident detection and response (IDR) application, a dynamic application security testing (DAST) application, a penetration testing application, a security orchestration and automation (SOAR) application, or a cloud security posture management (CSPM) application.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
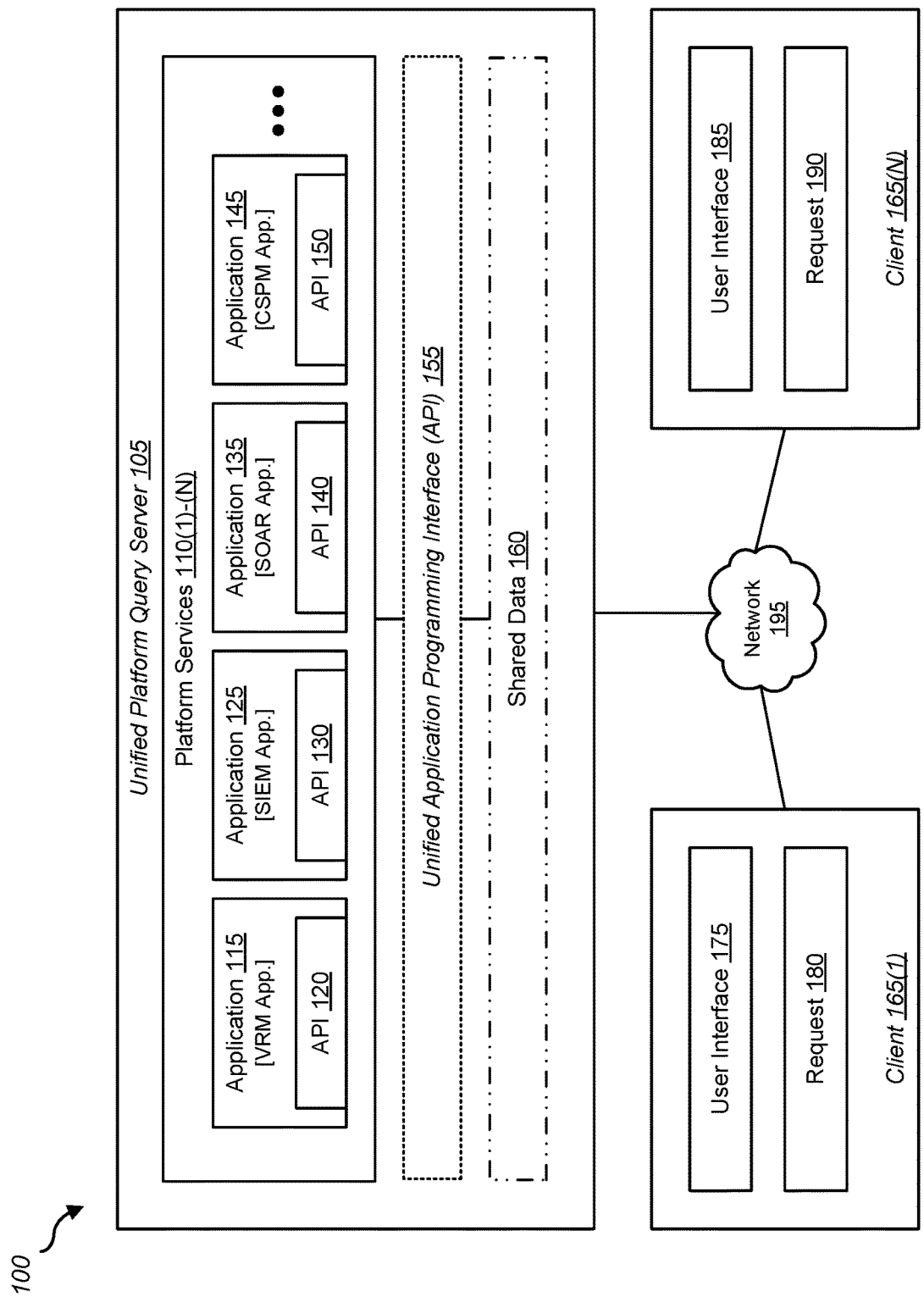
FIG. 1 is a block diagram 100 of an interface agnostic unified platform query system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A platform (e.g., a cloud cybersecurity platform (hereinafter "platform") such as The Insight Cloud Platform provided by Rapid7® of Boston, MA) is a series of Application Programming Interfaces (APIs). These APIs are called by client-side code (e.g., JavaScript) and a user interface (UI) is rendered in a user's browser based on these API calls. Such UIs require various patterns for data to be rendered and displayed appropriately (e.g., technical requirements based on UI specifications unique to each client).

Unfortunately, the rendering and display requirements (among other constraints) for UIs used by various clients that access the platform (e.g., simultaneously or in tandem) are rarely the same. These clients also have varying authentication and authorization requirements (e.g., depending on which API (e.g., application-specific API the UI code is calling in a given instance). For example, a client that submits a request with a query (e.g., for shared data) can do so using client-side code (e.g., UI code) that is tailored for a particular UI of the client. While this UI code may render the shared data properly in the client UI (e.g., in a browser) for one application, it may not do so for another application.

What's more, while different APIs may be able to render and display the same data (e.g., the shared data), they may clash or experience conflict with respect to the specifics of how the shared data is shown and presented to the client (e.g., in the client UI) because of the way in which the (shared) data is stored and/or represented. For example, a metric for online agents in an intrusion detection and response (IDR) application looks different from a metric for online agents in a vulnerability management (VM) application.

The foregoing causes confusion for customers. In addition, varying levels of access in different APIs can mean potential software bugs or security issues. For example, a given user can have a different level of access to data via one API than via another API if that data is accessed via a different avenue (e.g., a different browser, client device, and the like). In addition to customer confusion, customer security can also be negatively impacted. These preceding technology-related problems are particularly prescient in enterprise software solutions spanning multiple products (e.g., cloud-implemented web applications) and shared data.

Example Interface Agnostic Unified Platform Query System

FIG. 1 is a block diagram 100 of an interface agnostic unified platform query system, according to one embodiment. The interface agnostic unified platform query system includes a unified platform query server 105, which can be any type of computing device implemented on premises or in the 'Cloud' (hereinafter "cloud"). Unified platform query server 105 includes at least platform services 110 (1)-(N). Platform services 110 (1)-(N) include at least applications 115, 125, 135, and 145. In this example, applications 115, 125, 135, and 145 are web applications executing on a cloud cybersecurity platform (e.g., the platform discussed above).

For example, application 115 is a vulnerability risk management (VRM) application with an Application Programming Interface (API) 120, application 125 is a Security Information and Event Management (SIEM) application with an API 130 (e.g., a Incident Detection and Response (IDR) application), application 135 is a Security Orchestration and Automation (SOAR) application with an API 140, and application 145 is a Cloud Security Posture Management (CSPM) application with an API 150. APIs 120, 130, 140, and 150 can be called by various clients using client-side code to display shared data (e.g., data shared between applications 115, 125, 135, and 145) by rendering a user interface (UI) in a browser of the various respective clients based on API calls to APIs 120, 130, 140, and 150, respectively.

As shown in FIG. 1, unified platform query server 105 also includes a Unified Application Programming Interface (hereinafter "unified API") 155 and shared data 160. Unified API 155 is generated by unified platform query server 105 to facilitate the provision of shared data to clients 165(1)-(N). Clients 165(1)-(N), which can each be any type of physical or virtual computing devices, include a user interface and a generate request with a query for shared data that renders the user interface (e.g., after the request with the query is fulfilled by unified platform query server 105). For example, client 165(1) generates request 180 for shared data 160 from unified platform query server 105 that is then rendered and displayed in user interface 175. Similarly, client 165(N) generates request 190 for shared data 160 from unified platform query server 105 that is then rendered and displayed in user interface 185. Clients 165(1)-(N) and unified platform query server 105 are communicatively coupled to each other via network 195, which can be any type of network or interconnection.

Each UI (e.g., UI 175 and UI 185) has its own unique UI specification that affects how shared data is rendered in the UI and is displayed (e.g., in a browser). For example, UI 175 can include a UI specification with a first set of: (a) objects, object attributes, object relationships, actions on objects, actions on object attributes, and actions on object relationships at the conceptual level and (b) a function, parameters (both implicit and explicit), description, feedback, and errors at the semantic level. Similarly, UI 185 can include another UI specification with a second set of the foregoing objects, attributes, relationships, actions, function(s), parameter(s), and the like.

When APIs 120, 130, 140, or 150 are called by client-side UI code associated with clients 165(1) or 165(N), UIs 175 and 185 are respectively rendered on clients 165(1) and 165(N) based on various (pre-determined) patterns for shared data 160 (e.g., various constrains and requirements of the corresponding UI specifications of UIs 175 and 185 that shared data 160 has to adhere to). Unfortunately, because the UI specifications for clients 165(1) and 165(N) and client-side code generated by clients 165(1) and 165(N) as part of requests 180 and 190, respectively, are different and dissimilar, shared data 160 for application 115 and shared data 160 for application 125: (a) may not be rendered in the same manner in UI 175 (between applications) and (b) may not be rendered in the same manner in UIs 175 and 185 (between clients).

As noted above, the foregoing discrepancy 'between applications' and 'between clients' can cause customer confusion and can result in software bugs. In addition, because clients 165(1) and 165(N) likely have dissimilar request validation and authentication mechanisms (e.g., Role Based Access Control (RBAC), third-party authentication services, and the like), a user with a varying level of access permissions to applications 115, 125, 135, and 145 will encounter difficulties in accessing these applications from different devices and avenues (e.g., getting shared data 160 rendered correctly/properly).

To ameliorate the foregoing technology-related problems, unified platform query server 105 provides a single API (e.g., unified API 155) that includes a private contract (and a user facing contract) that provides one way access to shared data 160. In addition to providing one way access to shared data 160, unified API 155 also facilitates authentication with external identity providers. Further, unified API 155 also verifies authorization based on RBAC (e.g., simple access control and customer user built access controls that works across products).

In some embodiments, shared data 160 used (and required) by applications 115, 125, 135, and 145 can be initially collected by an agent operating on each of clients 165(1)-(N). For example, an agent on client 165(1) can collect at least process start/stop data, security log event codes, system event codes, honey credentials, protocol poisoning traps, file audit logs, asset identification information, registry information, file version and package information, log file contents, resource utilization metrics, event logs, and installed services data.

In other embodiments, while information like process start/stop data, security log event codes, and honey credentials are only utilized by application 125 (the SIEM application), asset identification information, file version and package information, and/or registry information is utilized by both applications 115 and 125 (the VRM application and the SIEM application). Therefore, this shared data 160 has to be rendered and displayed in an appropriate manner on user interfaces 175 and 185. As noted, the same information can be displayed in a different manner depending on which API the UI code is calling (e.g., API 120 or API 130). For example, a metric for online agents in the SIEM application looks different from a metric for online agents in the VRM application. Also as noted, this causes customer confusion in addition to a significant security risk given the different levels of access to the same data via different APIs (which may have varied validation and authentication requirements and paradigms).

Example Unified Platform Query Server

Figure 2:
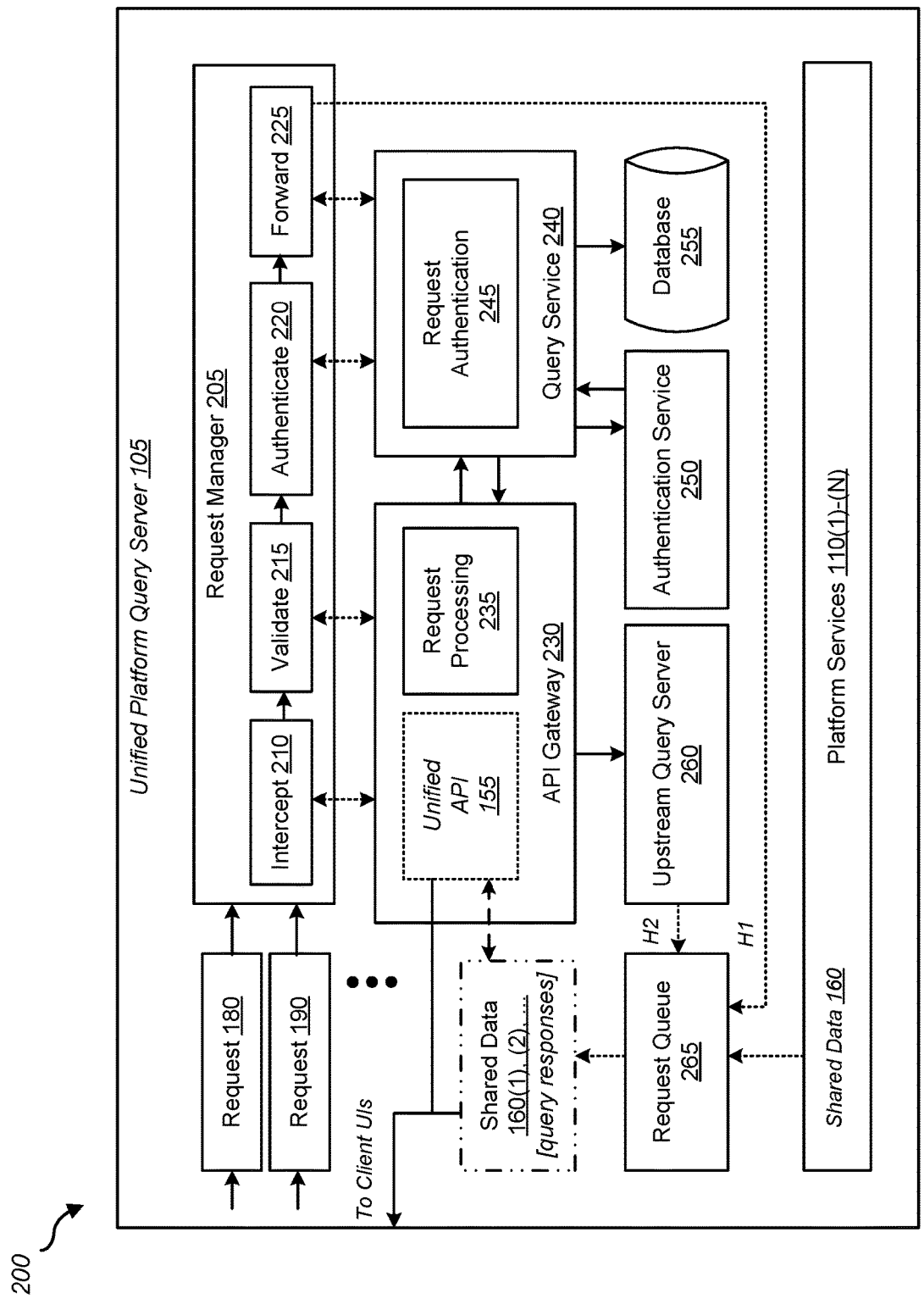
FIG. 2 is a block diagram 200 of a unified platform query server, according to one embodiment of the present disclosure.

FIG. 2 is a block diagram 200 of a unified platform query server that also performs query validation and authentication, according to one embodiment. Unified platform query server 105 also includes at least a request manager 205 to intercept 210, validate 215, authenticate 220, and forward 225 queries for shared data 160 (e.g., requests 180 and 190). Unified platform query server 105 further includes at least an API gateway 230 (that acts as a reverse proxy to manage unified API 155 and handle initial request processing 235), a query service 240 (also called "Guardian" service) that performs request authentication 245 and validation, an authentication service 250 (that performs user/identity authentication using a Platform Identity Management System (iPIMS)), a database 255 (e.g., a distributed in-memory key-value database implemented by an in-memory data structure for abstract data), an upstream query server 260 (e.g., for appending headers), and a request queue 265 (for managing multiple queries and/or requests).

In one embodiment, API gateway 230 provides unified API 155 that includes a private contract (and a user facing contract) that facilitates one way access to shared data 160. In addition to providing one way access to shared data 160, unified API 155 also facilitates authentication with external identity providers. Further, in this example, unified API 155 also verifies authorization based on RBAC (e.g., simple access control and customer user built access controls that works across products).

In another embodiment, unified API 155 uses a single query language (e.g., a data query and manipulation language for APIs and a runtime for fulfilling queries with existing data) to ensure that disparate UI code for clients 165(1)-(N) across platform services 110 (1)-(N) calls those services (e.g., APIs 120, 130, 140, and 150) in the same manner. Therefore, unified API 155 serves as a single source of truth for shared data 160 (e.g., unified API 155 can fulfill queries for online agent metrics from the VRM application or the SIEM application).

For example, if client 165(1) is a customer of both the VRM application and the SIEM application (e.g., applications 115 and 125), unified platform query server 105 permits data collected from an agent (e.g., such as the Insight Agent provided by Rapid7® of Boston, MA) about client 165(1) to be available only to a certain user group (e.g., My Host Admins). This requirement can simply be set in RBAC. In applications 115 and 125, when a user with an appropriate organization client code goes to a page in application 125 with host information that comes from the agent, a call is made to unified API 155 (e.g., the API call is intercepted). This call authenticates the user with the organization's identity provider (e.g., a Security Assertion Markup Language (SAML) 2 identity provider) and a check is performed to verify that the user belongs to the organization and is also part of the designated user group (e.g., My Host Admins). Provided that the foregoing steps are fulfilled successfully, the user will see the data (e.g., for application 125) appropriately/correctly. The same foregoing steps can be performed by the user for a page in application 115, using the same calls.

In some embodiments, a shared UI component is shared by both applications 115 and 125 because unified API 155 ensures that API interaction is the same wherever it occurs. In addition, a second user can generate a script with a platform API token that makes the same calls and performs the same validation, authorization, and authentication.

Example of Authenticating and Servicing Unified Platform Queries

In one embodiment, request manager 205 intercepts a request (e.g., request 180) for shared data 160 associated with web applications (e.g., applications 115, 125, 135, and 145) from user interface 175 associated with client 165(1). User interface 175 is rendered by client 165(1) based on a specification. Request manager 205 forwards request 180 to API gateway 230 (and unified API 155) instead of a disparate unique API associated with each of the above-mentioned web applications (e.g., 120, 130, 140, or 150, respectively). After API gateway 230 performs request processing 235, query service 240 performs request authentication 245 (e.g., to ensure that the request is a valid request) and authentication service 250 authenticates request 180 externally using unified API 155. Request 180 for shared data 160 is then authorized to be rendered and displayed on user interface 175 based on unified API 155 instead of the specification.

Similarly, request manager 205 intercepts another request (e.g., request 190) for shared data 160 from user interface 185 associated with client 165(N) that is rendered based on another specification. Request manager 205 forwards request 190 to unified API 155 (e.g., to API gateway 230) instead of APIs 120, 130, 140, or 150. Request 190 is then authenticated by query service 240 and user identity is authenticated by unified API 155 using authentication service 250. Request 190 is finally authorized for shared data 160 to be rendered and displayed in user interface 185 based on unified API 155 instead of the another specification.

As noted, the specification and the another specification (e.g., of user interfaces 175 and 185, respectively), cause shared data 160 to be rendered differently in user interface 175 and 185, respectively. In one embodiment, requests 180 and 190 each include a script with a token configured for unified API 155. Also as noted, a shared UI component can be implemented to enable unified API 155 to display shared data 160 consistently and uniformly in user interfaces 175 and 185 regardless of which application page(s) the user(s) are accessing.

In some embodiments, shared data 160 is collected by an agent executing on each client, and the web applications include the VRM application, an incident detection and response (IDR) application (e.g., the SIEM application), a dynamic application security testing (DAST) application, a penetration testing application, the SOAR application, a log management application, or the CSPM application.

The foregoing applications can share unique types of data that is determined to be shared data 160 by request manager 205. For example, if the data requested (e.g., in a query) includes asset identification information and/or registry information from the VRM application or the SIEM application, the API calls to those respectively applications are intercepted by request manager 205 (e.g., to APIs 120 and 130) and forwarded to API gateway 230. Asset identification information and/or registry information is also designated as part of shared data 160 if the request is associated with the log management application. However, if the data requested includes file version and package information, such a request is designated as being associated with shared data 160 only if the request is associated with the VRM application or the log management application. Similarly, if the data requested includes installed services information, such a request is designated as being associated with shared data 160 only if the request is associated with the SIEM application or the log management application.

Example Request with Query and Response

Figure 3:
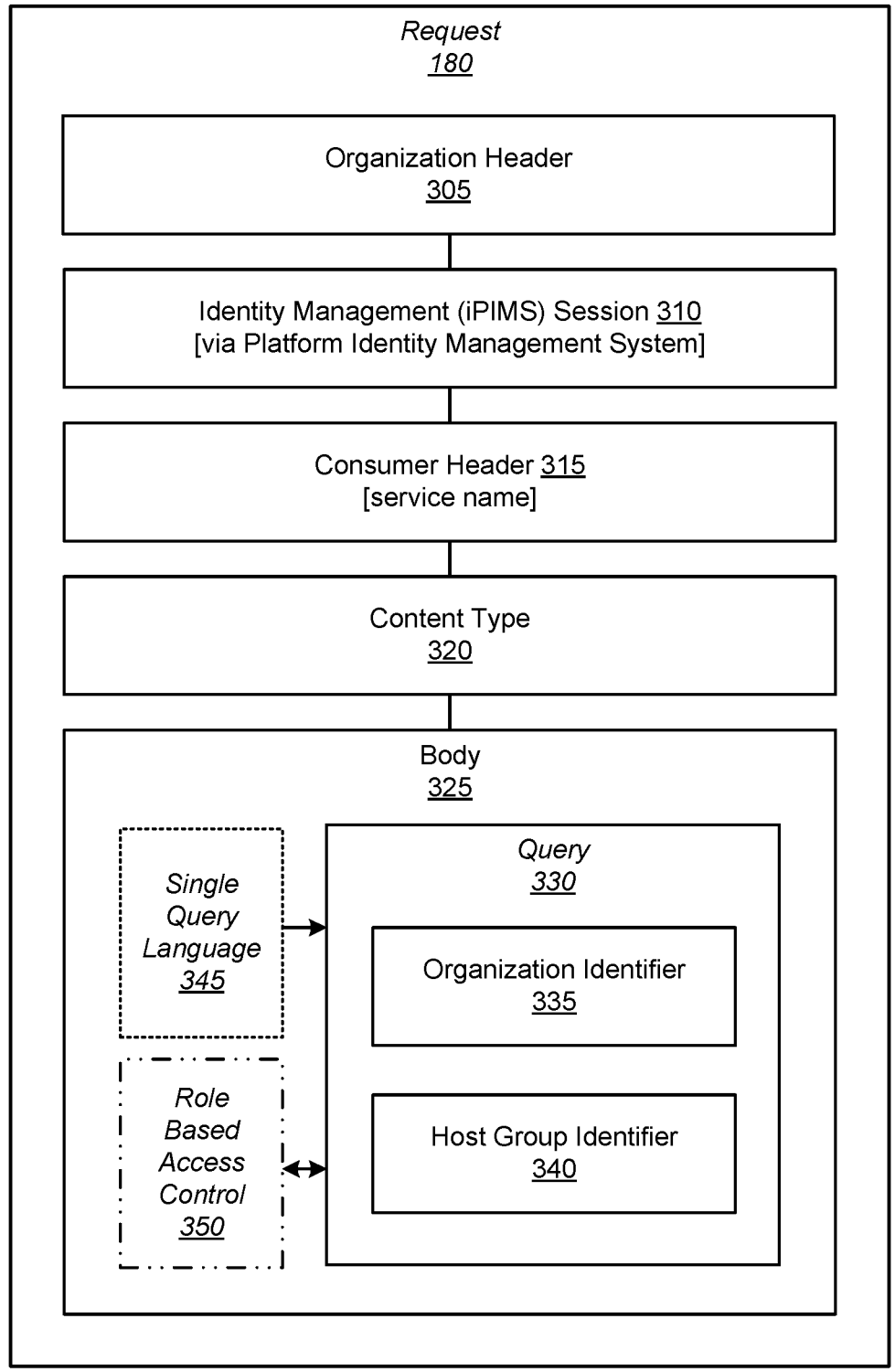
FIG. 3 is a block diagram 300 of a request and various sub-components, according to one embodiment of the present disclosure.

FIG. 3 is a block diagram 300 of a request and various sub-components, according to one embodiment. In certain embodiments, request 180 includes at least an organization header 305, an identity management (iPIMS) session 310, a consumer header 315, a content type 320, and a body 325. Body 325 further includes at least a query 330 and query 330 further includes at least an organization identifier 335 and a host group identifier 340. In this example, query 330 is permitted by query service 240 if query 330 meets one (or more) RBAC 350 requirements and is generated using a single query language 345 (provided by a single query language service). Request authentication 245 by query service 240 is performed on one or more web sockets using a standardized subscription request type of a subscription for the single query language service. As noted, in some embodiments, shared data 160 is displayed in user interface 175 (in the case of request 180) based on a data structure that is defined by unified API 155 instead of the specification of user interface 175 (and client 165(1)). In other embodiments, a header generated by request manager 205 is appended to request 180 that includes validation information associated with authenticating the request (shown as H1 in FIG. 2). Further, another header (e.g., an anonymous header used by upstream query server 260) that indicates that the request has been validated using unified API 155 instead of a disparate unique API is also appended to request 180 (shown as H2 in FIG. 2). The request is then passed on (e.g., to upstream query server 260 for servicing).

Example of Request Interception, Validation, Authentication, and Forwarding

In one embodiment, an incoming request is intercepted by request manager 205 and processed by API gateway 230. API gateway 230 validates that certain information exists in the request before forwarding the request to query service 240. API gateway 230 (e.g., request processing 235) checks for at least the following information: (a) an organization header 305 (OrgName-Organization-ID)—non-empty required, (b) a cookie that has an iPIMS session (IPIMS_SESSION)—non-empty required for both cookie and iPIMS session, (c) customer header 315 (OrgName-Consumer)—service name that is executing this request, (d) content type 320 (Content-Type)—non-empty required, and (e) body 325—non-empty required. If the foregoing checks are met, API gateway 230 forwards the request to query service 240 for validation.

Query service 240 receives the (processed) request from API gateway 230 and performs request authentication 245 to ensure that the information inside the request is valid. This process is performed by query service 240 using at least the following steps in certain embodiments: (a) validity of information in the request is checked, (b) iPIMS session is validated, (c) database 255 is checked to determine whether a similar request has been previously validated (if the request has not been previously validated, query service 240 requests authentication service 250 to validate the session ID and determine whether the user of the session is permitted access to the given organization ID—this validation can also be performed with external identity service providers), (d) body 325 is checked for a valid query and the type of operation that is being requested to be run is determined (QUERY/MUTATION/SUBSCRIPTION)—while a QUERY can be run by any user, MUTATION/SUBCRIPTION is only permitted if RBAC requirements are met (e.g., product administrator of the organization or a platform administrator), and (e) query 330 itself is also checked to ensure that organization identifier 335 that was passed into query 330 matches the given organization ID header (ensuring that users can only query for organizations that they have access to). If any of the above steps return as invalid, query service 240 sends a message to API gateway 230 to be forwarded to the user.

In some embodiments, a status message is sent by query service 240 to API gateway 230. For example, if the validation is successful, additional information regarding the successful validation is passed back to API gateway 230. However, if there is an error in validation, the status message returned to API gateway 230 from query service 240 can include a Hypertext Transfer Protocol (HTTP) 401 or 403 message. The status and associated error message is then returned to the user. On the other hand, if the validation is successful, a HTTP 200 message can be returned along with additional information to API gateway 230.

Finally, and in certain embodiments, in the event of successful validation and authentication of a request, information returned from query service 240 is appended to the original request (e.g., as headers). In addition, an anonymous header is added which is used by upstream query server 260 to authenticate that the request has been validated by query service 240. The request is then passed on (e.g., for servicing).

In one embodiment, query service 240 uses RBACv2 API calls to verify which resource sets (e.g., databases, storage devices, files, and the like) are being read and/or modified in the calls to query service 240 and further validates that these access permissions are possible for the given user. For example, these resource sets are defined by the user for their organization. The user groups that are given access to these resources are also user-defined.

In another embodiment, query service 240 performs request authentication 245 on web sockets using a subscription to a single query language service (e.g., persistent connections to the single query language service). Query service 240 performs the authentication steps described above upon the establishment of a connection. In this example, the subscription request type is standardized and therefore, query service 240 is able to perform validation using the same checks as a regular query or mutation (e.g., http).

Example Process for Authenticating and Servicing Unified Platform Queries

Figure 4:
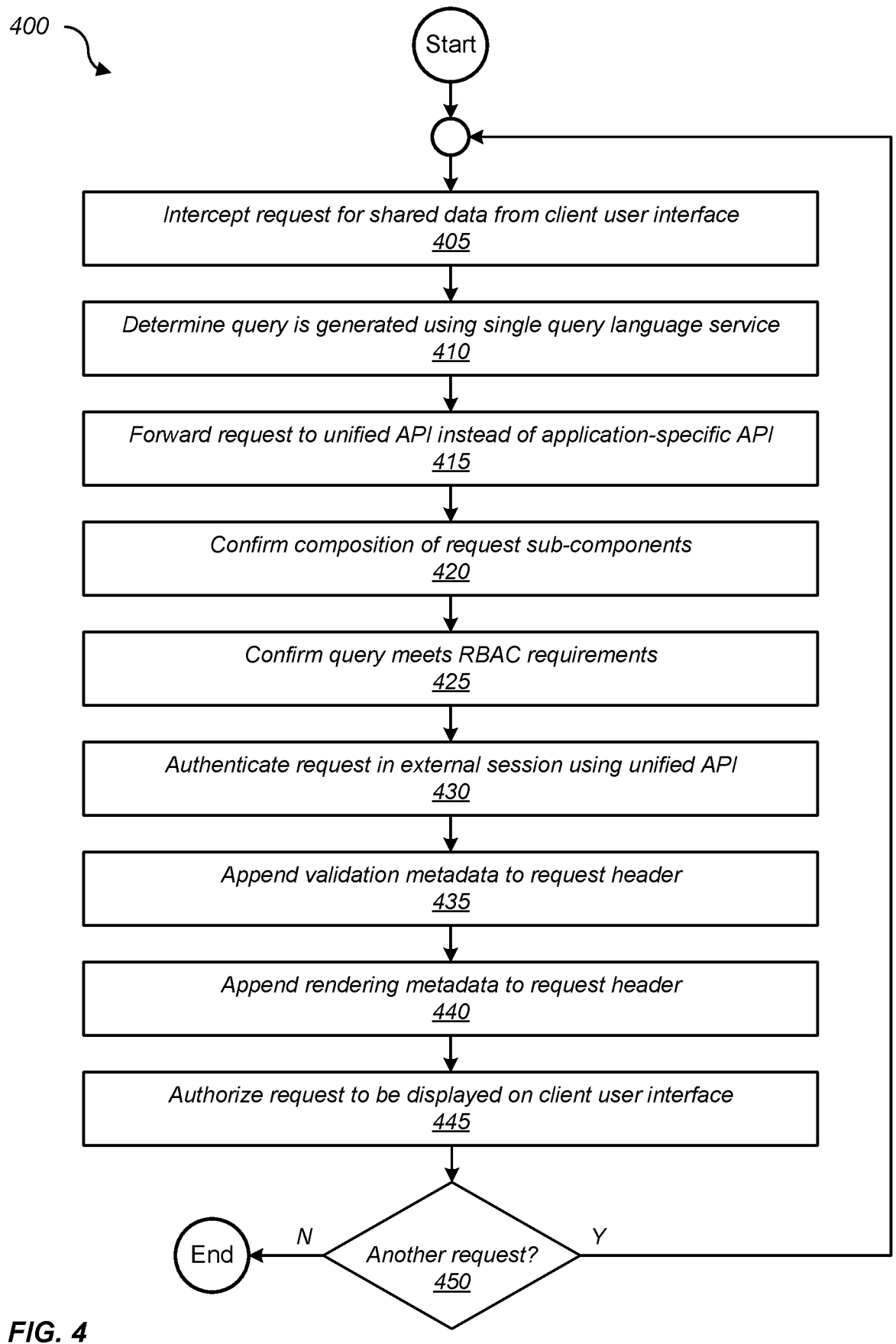
FIG. 4 is a flowchart 400 and illustrates a process for validating, authenticating, and responding to a query, according to one embodiment of the present disclosure.

FIG. 4 is a flowchart 400 and illustrates a process for validating, authenticating, and responding to a query, according to one embodiment. The process begins at 405 by intercepting a request for shared data from a client user interface (e.g., request 180 for shared data 160 from user interface 175, which can be a web browser). At 410, the process determines that the query is generated using a single query language service (e.g., based on a persistent subscription, among other indications), and at 415, forwards the request to unified API 155 instead of an application-specific API (e.g., to API gateway 230).

At 420, the process confirms the composition of request sub-components (e.g., determining that the request has non-empty organization header 305 (OrgName-Organization-ID), non-empty cookie that has non-empty iPIMS session (IPIMS_SESSION), non-empty customer header 315 (Org-Name-Consumer), non-empty content type 320 (Content-Type), and non-empty body 325. At 425, the process confirms the query meets RBAC requirements (e.g., using authentication service 250), and at 430, the authenticates the request in an external session using unified API 155 (e.g., using a Platform Identity Management System such as authentication service 250 as shown in FIG. 2).

At 435, the process appends validation metadata to the request header (e.g., information returned from query service 240 that the request has been successfully validated), and at 440, appends rendering metadata to the request header (e.g., indicating that the request has been validated by query service 240 and that the requested shared data can be provided as a response to the query based on unified API 155). At 450, the process determines if there is another request. If there is another request, the process loops to 405. Otherwise, the process ends.

Example Computing and Networking Environment

Figure 5:
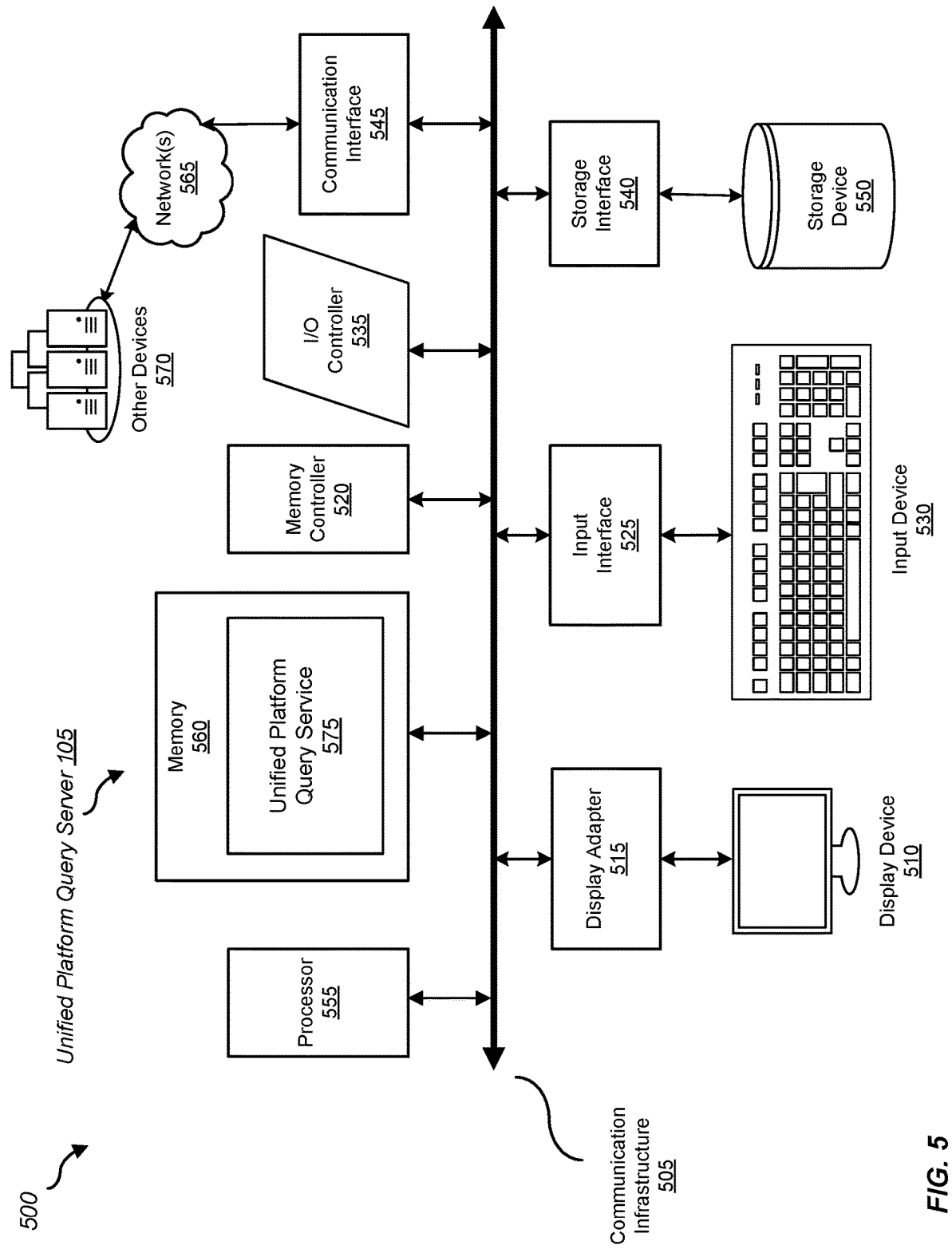
FIG. 5 is a block diagram 500 of a computing and networking system, illustrating how a unified platform query service can be implemented in software, according to one embodiment of the present disclosure.

FIG. 5 is a block diagram 500 of a networked computing system, illustrating how a unified platform query service 575 (which can be any combination of request manager 205, API gateway 230, query service 240, authentication service 250, and/or upstream query server 230), can be implemented in software, according to one embodiment. Computing system 500 can include unified platform query service 575 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes unified platform query service 575, computing system 500 becomes a special purpose computing device that is configured to accept and service interface agnostic validated unified platform queries.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing unified platform query service 575 (e.g., any combination of request manager 205, API gateway 230, query service 240, authentication service 250, and/or upstream query server 230) may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Example Networking Environment

Network 565 (e.g., network 195 of FIG. 1) generally represents any type or form of computer network or architecture capable of facilitating communication between unified platform query server 105 and clients 165(1)-(N). For example, network 565 can be a Wide Area Network (WAN) (e.g., the Internet) or a Local Area Network (LAN). In certain embodiments, a communication interface, such as communication interface 545 in FIG. 5, may be used to provide connectivity between unified platform query server 105 and clients 165(1)-(N), and network 140. The embodiments described and/or illustrated herein are not limited to the Internet or any particular network-based environment.

In some embodiments, request manager 205, API gateway 230, query service 240, authentication service 250, and/or upstream query server 230 may be part of unified platform query server 105 respectively, or may be separate. If separate, request manager 205, API gateway 230, query service 240, authentication service 250, and/or upstream query server 230 may be communicatively coupled via network 565. In one embodiment, all or a portion of one or more of embodiments may be encoded as a computer program and loaded onto and executed by unified platform query server 105, or any combination thereof, and may be stored on unified platform query server 105, and distributed over network 565.

In some examples, all or a portion of request manager 205, API gateway 230, query service 240, authentication service 250, and/or upstream query server 230 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, request manager 205, API gateway 230, query service 240, authentication service 250, and/or upstream query server 230 may transform the behavior of unified platform query server 105 to accept and service interface agnostic validated unified platform queries.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
intercepting a request for shared data directed to one of a plurality of web applications that use the shared data collected from a plurality of clients, wherein:
the request comprises a query that is generated using a single query language provided by a single query language service,
the request is received from a user interface associated with a web application executing on a client,
the user interface is rendered by the client based on a specification of the web application, and
the shared data is collected by application-specific agents executing on the clients;
forwarding the request to a unified application programming interface (API) instead of a disparate unique API associated with the web application;
authenticating the request from the client externally from the web application using the unified API based on a subscription for the single query language service, wherein the authenticating includes a validation of the request that verifies (a) the request includes a cookie and session information associated with an identity management session and (b) the query is permitted under one or more role based access control (RBAC) requirements;
appending a header to the request that comprises validation information associated with the validation of the request performed during the authenticating of the request;
appending another header to the request that indicates that the request has been validated using the unified API instead of the disparate unique API; and
authorizing the request for the shared data to be displayed in the user interface based on a data structure defined by the unified API instead of the specification.

2. The computer-implemented method of claim 1, further comprising:
intercepting another request for the shared data from another user interface associated with another client that is rendered based on another specification, and
forwarding the other request to the unified API instead of another disparate unique API associated with another one of the web applications;
authenticating the other request from the other client using the unified API; and
authorizing the other request for the shared data to be displayed in the other user interface based the unified API instead of the other specification.

3. The computer-implemented method of claim 2, wherein:
the specification and the other specification cause the shared data to be rendered differently in the user interface and the other user interface, and
the request and the other request each comprise a script with a token configured for the unified API.

4. The computer-implemented method of claim 3, further comprising:
generating a shared user interface component to enable the unified API to display the shared data in the user interface and the other user interface.

5. The computer-implemented method of claim 1, wherein:
the request comprises an organization header, a consumer header, a content type, and a body,
the body comprises the query,
the query comprises an organization identifier and a host group identifier, and
the one or more role based access control (RBAC) requirements is based on the organization identifier or the host group identifier.

6. The computer-implemented method of claim 5, wherein:
the authentication is performed on one or more web sockets using a standardized subscription request type of the subscription for the single query language service.

7. The computer-implemented method of claim 1, wherein:
the shared data comprises two or more of process start/stop data, security log event codes, system event codes, honey credentials, protocol poisoning traps, file audit logs, asset identification information, registry information, file version and package information, log file contents, resource utilization metrics, event logs, and installed services data; and
the web applications comprise two or more of a vulnerability risk management (VRM) application, an incident detection and response (IDR) application, a dynamic application security testing (DAST) application, a penetration testing application, a security orchestration and automation (SOAR) application, or a cloud security posture management (CSPM) application.

8. A non-transitory computer readable storage medium comprising program instructions executable to:
intercept a request for shared data directed to one of a plurality of web applications that use the shared data collected from a plurality of clients, wherein:
the request comprises a query that is generated using a single query language provided by a single query language service,
the request is received from a user interface associated with a web application executing on a client,
the user interface is rendered by the client based on a specification of the web application, and
the shared data is collected by application-specific agents executing on the clients;
forward the request to a unified application programming interface (API) instead of a disparate unique API associated with the web application;
authenticate the request from the client externally from the web application using the unified API based on a subscription for the single query language service, wherein the authenticating includes a validation of the request that verifies (a) the request includes a cookie and session information associated with an identity management session and (b) the query is permitted under one or more role based access control (RBAC) requirements;

append a header to the request that comprises validation information associated with the validation of the request performed during the authenticating of the request;

append another header to the request that indicates that the request has been validated using the unified API instead of the disparate unique API; and authorize the request for the shared data to be displayed in the user interface based on a data structure defined by the unified API instead of the specification.

9. The non-transitory computer readable storage medium of claim 8, further comprising:

intercepting another request for the shared data from another user interface associated with another client that is rendered based on another specification, and forwarding the other request to the unified API instead of another disparate unique API associated with another one of the web applications;

authenticating the other request from the other client using the unified API; and authorizing the other request for the shared data to be displayed in the other user interface based the unified API instead of the other specification.

10. The non-transitory computer readable storage medium of claim 9, wherein:

the specification and the other specification cause the shared data to be rendered differently in the user interface and the other user interface, and the request and the other request each comprise a script with a token configured for the unified API.

11. The non-transitory computer readable storage medium of claim 10, further comprising:

generating a shared user interface component to enable the unified API to display the shared data in the user interface and the other user interface.

12. The non-transitory computer readable storage medium of claim 8, wherein:

the request comprises an organization header, a consumer header, a content type, and a body, the body comprises the query, the query comprises an organization identifier and a host group identifier, and the one or more role based access control (RBAC) requirements is based on the organization identifier or the host group identifier.

13. The non-transitory computer readable storage medium of claim 12, wherein the authentication is performed on one or more web sockets using a standardized subscription request type of the subscription for the single query language service.

14. The non-transitory compute readable storage medium of claim 8, wherein:

the shared data comprises two or more of process start/stop data, security log event codes, system event codes, honey credentials, protocol poisoning traps, file audit logs, asset identification information, registry information, file version and package information, log file contents, resource utilization metrics, event logs, and installed services data; and the web applications comprise two or more of at least a vulnerability risk management (VRM) application, an incident detection and response (IDR) application, a dynamic application security testing (DAST) application, a penetration testing application, a security orchestration and automation (SOAR) application, or a cloud security posture management (CSPM) application.

15. A system comprising:

one or more processors; and a memory coupled to the one or more processors, wherein the memory stores program instructions executable by the one or more processors to:

intercept a request for shared data directed to one of a plurality of web applications that use the shared data collected from a plurality of clients, wherein:

the request comprises a query that is generated using a single query language provided by a single query language service, the request is received from a user interface associated with a web application executing on a client, the user interface is rendered by the client based on a specification of the web application, and the shared data is collected by application-specific agents executing on the clients;

forward the request to a unified application programming interface (API) instead of a disparate unique API associated with the web application;

authenticate the request from the client externally from the web application using the unified API based on a subscription for the single query language service, wherein the authenticating includes a validation of the request that verifies (a) the request includes a cookie and session information associated with an identity management session and (b) the query is permitted under one or more role based access control (RBAC) requirements;

append a header to the request that comprises validation information associated with the validation of the request performed during the authenticating of the request;

append another header to the request that indicates that the request has been validated using the unified API instead of the disparate unique API; and authorize the request for the shared data to be displayed in the user interface based on a data structure defined by the unified API instead of the specification.

16. The system of claim 15, wherein the request comprises an organization header, a consumer header, a content type, and a body, the body comprises the query, the query comprises an organization identifier and a host group identifier, the one or more role based access control (RBAC) requirements is based on the organization identifier or the host group identifier.

17. The system of claim 15, wherein the authentication is performed on one or more web sockets using a standardized subscription request type of the subscription for the single query language service.

* * * * *